H. N. FRYATT.
CENTRIFUGAL SUGAR MACHINE.

No. 35,441. Patented June 3, 1862

UNITED STATES PATENT OFFICE.

HORATIO N. FRYATT, OF BELLEVILLE, NEW JERSEY.

IMPROVED CENTRIFUGAL MACHINE FOR FILTERING LIQUIDS.

Specification forming part of Letters Patent No. 35,441, dated June 3, 1862.

*To all whom it may concern:*

Be it known that I, HORATIO N. FRYATT, of Belleville, in the State of New Jersey, have invented a new and useful Improvement in Machines for Filtering Liquids by Centrifugal Action; and I do hereby declare that the following is a full, clear, and exact description thereof, reference being had to the accompanying drawings, making part of this specification, in which—

Figure 2:
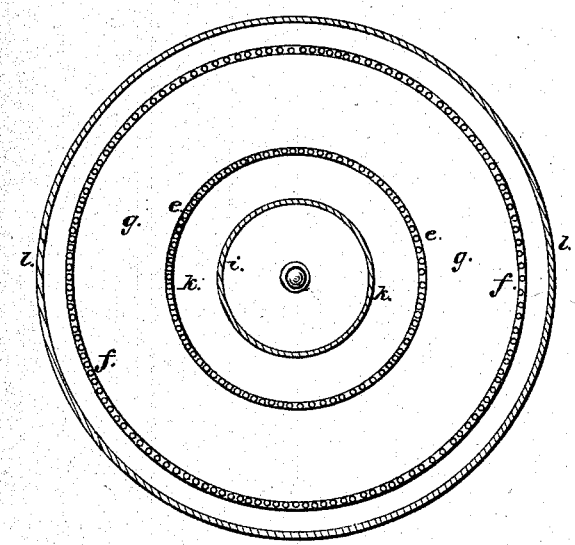
Figure 1:
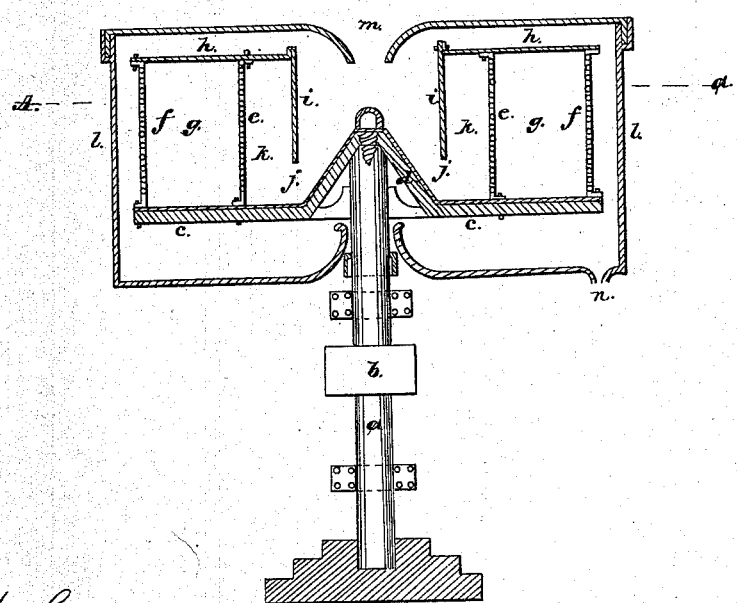

Figure 1 is a vertical section of the machine, and Fig. 2 a horizontal section taken at the line A *a* of Fig. 1.

The same letters indicate like parts in both figures.

My said invention relates to improvements in the well-known machine for drying cloths by centrifugal force, and which has also been used for separating molasses from the crystals of sugar, by which I am enabled to apply it successfully to the purposes of decolorizing saccharine juices and other liquids, and to the rectification of alcoholic liquors, and generally to filtration for the separation of liquids from impurities; and my said invention consists in making the well-known centrifugal machine with a concentric annular compartment outside of a central chamber, and closed at top and bottom, and with the inner and outer peripheries of the said annular chamber pervious, to contain pulverized charcoal or other filtering or filtering and decolorizing or deodorizing substance, so that the liquid introduced in the central chamber shall be forced by centrifugal action from the central chamber through the pervious inner periphery of the annular chamber, thence through the material contained in the said annular chamber; and my said invention also consists in combining with the annular filtering-chamber a cap extending from its inner periphery, leaving a central opening for the introduction of the liquid to the central chamber, and an annular hoop extending downward from this cap, leaving a passage between its lower edge and the bottom of the central chamber for the passage of the liquid to be filtered, that a body of such liquid may accumulate against and inside of the inner periphery of the filtering-chamber without danger of its escape through the central feed-hole in the cap-plate.

In the accompanying drawings, *a* represents a vertical shaft with a pulley, *b*, to receive a belt from some suitable motor. To the upper end of this shaft is properly secured a circular disk, *c*, having a central conical projection, *d*. On the top of this disk are secured two cylinders, *e* and *f*, forming an annular filtering-chamber, *g*, the two cylinders being made pervious either by using punched metal or wire-gauze, or both, or in any other suitable manner. These pervious cylinders constitute the inner and outer peripheries of the filtering-chamber, which is to contain pulverized charcoal or other suitable substance, as before stated. This filtering-chamber is covered by a cap-plate, *h*, which extends some distance within the pervious cylinder *e*, and to the under face of this cap and at or near its inner periphery there is a hoop or third cylinder, *i*, non-perforated, and of less depth than the cylinders *e* or *f*, so as to leave a passage, *j*, for the liquid to pass from the center to an annular space, *k*, between the third cylinder, *i*, and the inner pervious periphery of the filtering-chamber, where it can accumulate to be carried by centrifugal force through the filtering medium. The whole is surrounded by a casing, *l*, having a central hole, *m*, at top for the introduction of the liquid to be filtered, and a hole, *n*, at bottom for the discharge of the liquid after it has been forced through the filtering medium by the centrifugal force due to the rotation. The filtering-chamber is to be charged with pulverized charcoal or other filtering, decolorizing, or deodorizing material, depending upon the liquid to be treated, and the best way is to pack it in so that the most finely-pulverized portion will be next to the outer periphery of the chamber, and gradually coarser toward the inner periphery.

The liquid to be treated is introduced in a constant stream through the central hole in the top of the surrounding casing, and falling on the surface of the cone *d* is, by the centrifugal force due to the rapid rotation of the apparatus, forced outward under the lower edge of the inner cylinder *i* to the annular space *k*, in which, by the force of the outward current, it rises, pressing outwardly against the entire surface of the inner pervious cylinder *e*. It then passes through the perforations of this cylinder and the filtering medium, and is finally discharged into the surrounding case.

By reason of the great force due to centrifugal action the liquid can be forced through filtering matter which it could not otherwise penetrate, and hence all impurities or foreign matter, the particles of which are less minute than those of the liquid to be purified will be retained, and none but the pure liquid will escape. I have discovered that by this apparatus I am enabled to decolorize saccharine juices, rectify spirits, and purify other liquids in the most perfect manner and in much less time than by any other known means.

What I claim as my invention, and desire to secure by Letters Patent, is—

1. Constructing the centrifugal machine for filtering purposes with an annular filtering-chamber surrounding a central reception-chamber, the said filtering-chamber having a closed top and bottom, and its sides being formed of an outer and inner pervious cylinder, with the inside filled with pulverized charcoal or its equivalent, substantially as and for the purpose set forth.

2. In combination with the central reception-chamber and the annular filtering-chamber, the cap extending inward over the reception-chamber, and the inner cylinder to form a chamber in which the liquid accumulates before passing through the filtering-chamber, substantially as and for the purpose set forth.

H. N. FRYATT.

Witnesses:
Wm. H. Bishop,
A. DeLacy.